United States Patent
Kumar et al.

(10) Patent No.: US 12,331,170 B2
(45) Date of Patent: Jun. 17, 2025

(54) PROCESS FOR THE PRODUCTION OF HOMOGENEOUS SOLUTIONS OF POLYACRYLONITRILE-BASED POLYMER

(71) Applicant: Cytec Industries Inc., Princeton, NJ (US)

(72) Inventors: Varun Kumar, Greenville, SC (US); Peter Mills, Yorkshire (GB); Jeremy Moskowitz, Mauldin, SC (US); John Desmond Cook, Simpsonville, SC (US); James Smith, Easley, SC (US); Billy Harmon, Simpsonville, SC (US)

(73) Assignee: CYTEC INDUSTRIES INC., Lawrence, NJ (US)

( * ) Notice: Subject to any disclaimer, the term of this patent is extended or adjusted under 35 U.S.C. 154(b) by 789 days.

(21) Appl. No.: 17/442,869

(22) PCT Filed: Mar. 27, 2020

(86) PCT No.: PCT/US2020/025339
§ 371 (c)(1),
(2) Date: Sep. 24, 2021

(87) PCT Pub. No.: WO2020/205562
PCT Pub. Date: Oct. 8, 2020

(65) Prior Publication Data
US 2022/0153935 A1    May 19, 2022

Related U.S. Application Data
(60) Provisional application No. 62/825,894, filed on Mar. 29, 2019.

(51) Int. Cl.
    *C08J 3/05*     (2006.01)
    *B01F 23/50*    (2022.01)
    (Continued)

(52) U.S. Cl.
    CPC ............. *C08J 3/05* (2013.01); *B01F 23/511* (2022.01); *B01F 23/565* (2022.01); *B01F 23/59* (2022.01);
    (Continued)

(58) Field of Classification Search
    CPC . C08J 3/05; C08J 3/097; C08J 2333/20; C08J 2433/26; C08J 3/02; C08J 2333/26;
    (Continued)

(56) References Cited

U.S. PATENT DOCUMENTS

| 4,324,707 A | 4/1982 | Hungerford |
| 4,403,055 A | 9/1983 | Hungerford |

(Continued)

FOREIGN PATENT DOCUMENTS

| EP | 2894188 A1 | 7/2015 |
| JP | 2003340253 A | 12/2003 |

(Continued)

*Primary Examiner* — Andrew J. Oyer
*Assistant Examiner* — Cullen L G Davidson
(74) *Attorney, Agent, or Firm* — Thi Dang

(57) ABSTRACT

The present disclosure relates to a process for producing homogeneous solutions comprising dissolved polyacrylonitrile-based polymer, and a system suitable therefor. The homogeneous polymer solutions produced by the process described herein may be used for producing carbon fiber, typically carbon fiber used in manufacturing composite materials.

18 Claims, 2 Drawing Sheets

(51) Int. Cl.
*B01F 25/431* (2022.01)
*C08J 3/02* (2006.01)
*C08J 3/09* (2006.01)
*D01D 1/02* (2006.01)
*D01D 1/06* (2006.01)
*D01F 6/18* (2006.01)
*D01F 6/38* (2006.01)

(52) U.S. Cl.
CPC ....... *B01F 25/431951* (2022.01); *C08J 3/097* (2013.01); *C08J 2333/20* (2013.01); *C08J 2433/26* (2013.01)

(58) Field of Classification Search
CPC ...... B01F 23/511; B01F 23/565; B01F 23/59; B01F 25/431951; D01D 1/02; D01D 1/065; D01F 6/18; D01F 6/38; D01F 9/22
See application file for complete search history.

(56) References Cited

U.S. PATENT DOCUMENTS

| | | | |
|---|---|---|---|
| 9,296,889 B2 | 3/2016 | Francalanci et al. | |
| 9,428,850 B2 | 8/2016 | Yu et al. | |
| 2015/0240145 A1* | 8/2015 | Newman | C09K 8/36 507/100 |
| 2015/0259480 A1* | 9/2015 | Maeno | D01F 6/38 523/323 |
| 2015/0376391 A1* | 12/2015 | Francalanci | B01F 25/42 524/173 |
| 2016/0016345 A1 | 1/2016 | Kumar et al. | |
| 2017/0241049 A1 | 8/2017 | Zeng et al. | |

FOREIGN PATENT DOCUMENTS

| | | |
|---|---|---|
| JP | 2012500910 A | 1/2012 |
| JP | 2013119202 A | 6/2013 |
| WO | 201438539 A1 | 3/2014 |

* cited by examiner

PROCESS FOR THE PRODUCTION OF HOMOGENEOUS SOLUTIONS OF POLYACRYLONITRILE-BASED POLYMER

CROSS REFERENCE TO RELATED APPLICATIONS

This application is a U.S. national phase entry under 35 U.S.C. § 371 of International Application No. PCT/US2020/025339, filed on Mar. 27, 2020, which claims the priority of U.S. Provisional Application No. 62/825,894, filed Mar. 29, 2019. The entire contents of these applications are explicitly incorporated herein by this reference.

FIELD OF THE INVENTION

The present disclosure relates generally to the production of solutions of polyacrylonitrile-based polymer. The solutions of polyacrylonitrile-based polymer produced may be used to produce carbon fiber, typically carbon fiber used in manufacturing composite materials.

BACKGROUND

Carbon fibers have been used in a wide variety of applications because of their desirable properties, such as high strength and stiffness, high chemical resistance and low thermal expansion. For example, carbon fibers can be formed into a structural part that combines high strength and high stiffness, while having a weight that is significantly lighter than a metal component of equivalent properties. Increasingly, carbon fibers are being used as structural components in composite materials for aerospace and automotive applications, among others. In particular, composite materials have been developed wherein carbon fibers serve as a reinforcing material in a resin or ceramic matrix.

Carbon fiber from acrylonitrile is generally produced by a series of manufacturing steps or stages, including polymerization, spinning, drawing and/or washing, oxidation, and carbonization. Polyacrylonitrile (PAN) polymer is currently the most widely used precursor for carbon fibers. Generally, PAN polymer may be made in a solvent in which the polymer is soluble, thereby forming a solution, typically referred to as spin "dope", which is ready for spinning into precursor fibers. Alternatively, PAN polymer may be made in a medium, typically aqueous medium, in which the resulting polymer is sparingly soluble or non-soluble. Such a polymer would be isolated and processed into a suitable form for use in producing spin dope for spinning into precursor fibers.

Ideally, spinning solutions should contain the desired PAN polymers at high concentration and be homogenous and gel-free. However, the formation of such solutions by combining solid polyacrylonitrile-based polymers with solvent in a manner sufficient to produce carbon fiber at industrial scale is challenging. Depending upon the solvent, there is a tendency for the polymer particles, when they come in contact with the solvent, to adhere to one another, thereby forming agglomerates, which is undesirable. Some solvents, for example dimethylsulfoxide (DMSO), are so effective a solvent for PAN that even at room temperature, i.e., approximately 20° C., powdered particles of PAN polymer do, in the presence of DMSO, adhere to one another, forming agglomerates and, in addition to prematurely increasing the viscosity of the system, form gels and coalesced masses which are difficult to dissolve into the body of the solvent. Formation of gels and insoluble agglomerates consequently leads to the rapid clogging of industrial filters, frequent spinneret change, among other problems, which are not suitable for industrial processes, particularly continuous processes.

U.S. Pat. Nos. 4,403,055 and 9,296,889 generally disclose adding water to DMSO to reduce its solubilizing capacity with respect to the polymer. However, such processes have the significant drawback of having the need to remove the relevant quantity of water by heating under vacuum, requiring long periods of time and high expenditure of energy.

It is possible to limit the dissolution of a polymer in a solvent by operating at low temperatures (for example, temperatures ranging from −5° C. to 10° C.) during the mixing of the solid polymer with the liquid solvent. However, in the case of DMSO, such a method cannot be used due to the high melting point of DMSO (18.5° C.). At temperatures only slightly lower than room temperature, DMSO is typically in solid phase. U.S. Pat. No. 4,324,707 discloses treating polyacrylonitrile polymer with DMSO at low temperature (below 18° C., the freezing point of DMSO) to reduce the kinetics of the dissolution but providing free flowing particles of polyacrylonitrile polymer and DMSO, not solutions of the polyacrylonitrile polymer.

Thus, there is an ongoing need for processes for producing clear, agglomerate- and/or gel-free polyacrylonitrile-based polymer solutions having high solids concentrations for use in producing carbon fiber, such as carbon fiber used in manufacturing composite materials, in industrial settings.

SUMMARY OF THE INVENTION

An objective of the present disclosure is to provide processes for producing homogeneous solutions free of gels and/or agglomerated polymer and that are suitable for use in producing carbon fiber, such as carbon fiber used in manufacturing composite materials, in an industrial process, particularly a continuous process.

This objective, and others which will become apparent from the following detailed description, are met in whole or in part by the processes of the present disclosure.

In a first aspect, the present disclosure relates to a process for producing a homogeneous solution comprising dissolved polyacrylonitrile-based polymer, the process comprising:

a) combining the polyacrylonitrile-based polymer, in the form of a powder, directly with a solvent for the polymer, wherein the solvent is free of non-solvent, at ambient temperature, b) subjecting the combination obtained in step a) to the shearing action of at least one rotor-stator at ambient temperature to produce a substantially uniform dispersion, and c) heating the dispersion obtained in step b) at a temperature and for a time sufficient to completely dissolve the polyacrylonitrile-based polymer, thereby forming the homogeneous solution.

In a second aspect, the present disclosure relates to a system for producing a homogeneous solution described herein, the system comprising:

i) a dispersing apparatus comprising:
  a powder inlet,
  an auger,
  a solvent inlet,
  an injection mantel comprising one or more solvent injection holes,
  at least one rotor-stator, and
  a product outlet; and ii) a plug flow static mixer heat exchanger.

DETAILED DESCRIPTION

Figure 1:
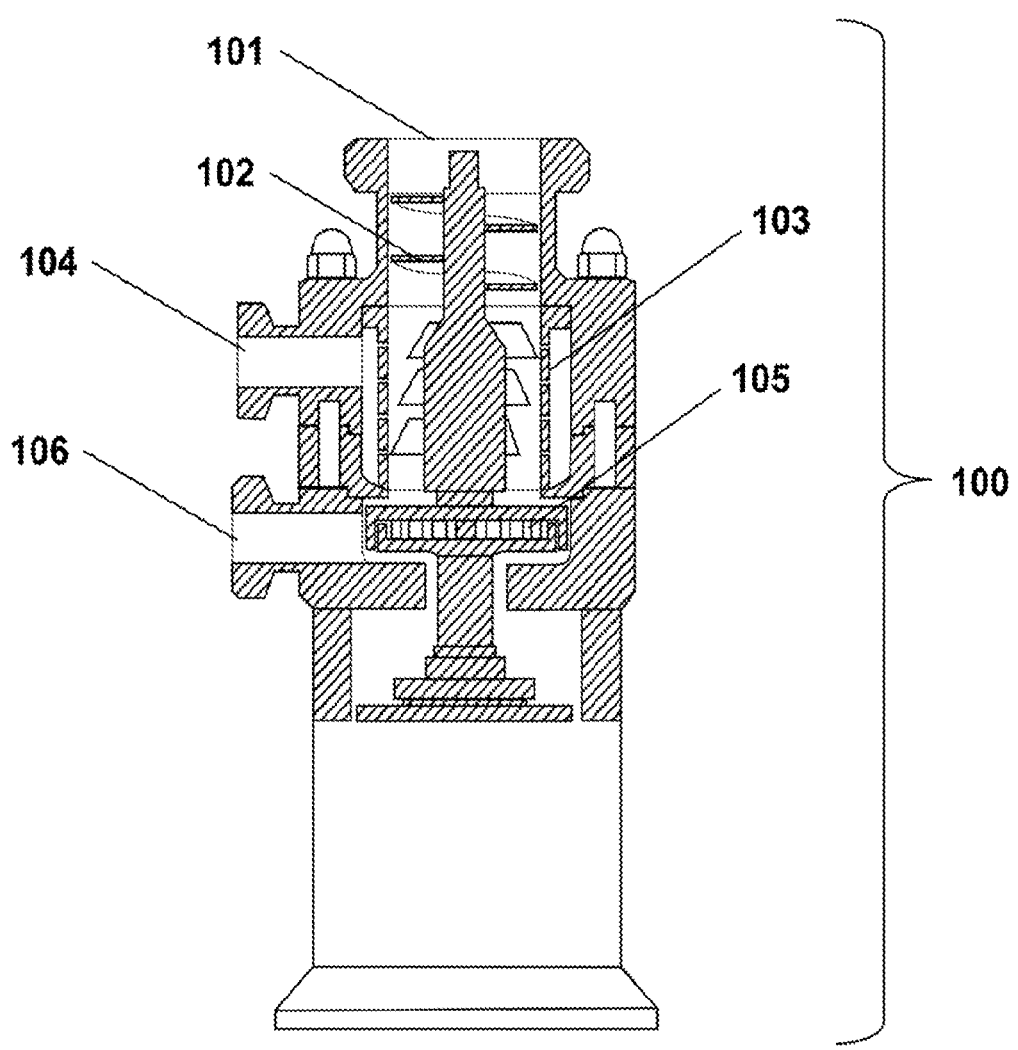
FIG. 1 shows a cut-away view of an embodiment of the dispersing apparatus described herein.

As used herein, the terms "a", "an", or "the" means "one or more" or "at least one" and may be used interchangeably, unless otherwise stated.

As used herein, the term "comprises" includes "consists essentially of" and "consists of." The term "comprising" includes "consisting essentially of" and "consisting of."

Unless defined otherwise, all technical and scientific terms used herein have the same meaning as is commonly understood by one of skill in the art to which this specification pertains.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The phrase "free of" means that there is no external addition of the material modified by the phrase and/or that there is no detectable amount of the said material that may be observed by analytical techniques known to the ordinarily-skilled artisan for detecting the said material, such as, for example, gas or liquid chromatography, spectrophotometry, optical microscopy, and the like. The phrase "essentially free of" means that there may be unavoidable levels of the material modified by the phrase but that do not materially affect the properties of the compositions, and the like, containing such material.

The first aspect of the present disclosure relates to a process for producing a homogeneous solution comprising dissolved polyacrylonitrile-based polymer, the process comprising:

a) combining the polyacrylonitrile-based polymer, in the form of a powder, directly with a solvent for the polymer, wherein the solvent is free of non-solvent, at ambient temperature, b) subjecting the combination obtained in step a) to the shearing action of at least one rotor-stator at ambient temperature to produce a substantially uniform dispersion, and c) heating the dispersion obtained in step b) at a temperature and for a time sufficient to completely dissolve the polyacrylonitrile-based polymer, thereby forming the homogeneous solution.

Step a) of the process is combining the polyacrylonitrile-based polymer, in the form of a powder, directly with a solvent for the polymer, wherein the solvent is free of non-solvent, at ambient temperature.

The polyacrylonitrile-based polymer, in the form of a powder, may be obtained from commercial sources or may be synthesized according to methods known to those of ordinary skill in the art. The polyacrylonitrile-based polymer may be a homopolymer or a copolymer.

In an embodiment, the polyacrylonitrile-based polymer comprises repeating units derived from acrylonitrile and at least one comonomer selected from the group consisting of vinyl-based acids, vinyl-based esters, vinyl amides, vinyl halides, ammonium salts of vinyl compounds, sodium salts of sulfonic acids, and mixtures thereof.

In another embodiment, the polyacrylonitrile-based polymer comprises repeating units derived from acrylonitrile and at least one comonomer selected from the group consisting of methacrylic acid (MAA), acrylic acid (AA), itaconic acid (ITA), methacrylate (MA), ethyl acrylate (EA), butyl acrylate (BA), methyl methacrylate (MMA), ethyl methacrylate (EMA), propyl methacrylate, butyl methacrylate, β-hydroxyethyl methacrylate, dimethylaminoethyl methacrylate, 2-ethylhexylacrylate, isopropyl acetate, vinyl acetate (VA), vinyl propionate, vinyl imidazole (VIM), acrylamide (AAm), diacetone acrylamide (DAAm), allyl chloride, vinyl bromide, vinyl chloride, vinylidene chloride, sodium vinyl sulfonate, sodium p-styrene sulfonate (SSS), sodium methallyl sulfonate (SMS), sodium-2-acrylamido-2-methyl propane sulfonate (SAMPS), and mixtures thereof.

The comonomer ratio (amount of one or more comonomers to amount of acrylonitrile) is not particularly limited. However, a suitable comonomer ratio is 0 to 20%, typically 1 to 5%, more typically 1 to 3%.

The molecular weight of the polyacrylonitrile-based polymers suitable for use according to the described process may be within the range of 60 to 500 kg/mole, typically 90 to 250 kg/mole, more typically 115 to 180 kg/mole.

The solvent for the polymer refers to any compound capable of dissolving the polymer, typically completely. Examples of suitable solvents include, but are not limited to, dimethyl sulfoxide (DMSO), dimethyl formamide (DMF), dimethyl acetamide (DMAc), and ethylene carbonate (EC). In an embodiment, the solvent is dimethyl sulfoxide (DMSO).

In accordance to the process of the present disclosure, the solvent that is combined with the polyacrylonitrile-based polymer is free of non-solvent. As used herein, non-solvent refers to any compound that does not dissolve the polyacrylonitrile-based polymer. In an embodiment, the solvent for the polymer is free of water.

Step a) of combining the polyacrylonitrile-based polymer, in the form of a powder, directly with the solvent for the polymer can be achieved in any manner known to those of ordinary in the art. In an embodiment, combining the polyacrylonitrile-based polymer, in the form of a powder, directly with the solvent can be conducted by spraying one or more fine streams of the solvent onto a stream of the polyacrylonitrile-based polymer in the form of a powder.

Step a) may further comprise distributing the polyacrylonitrile-based polymer. As used herein, distributing the polyacrylonitrile-based polymer refers to breaking up clusters or agglomerates of powdered polymers into smaller particles such that the polymer particles may be better dispersed in step b).

According to the process, step a) is conducted at ambient temperature. In an embodiment, step a) is conducted at a temperature of from 20° C. to 40° C., typically 25° C. to 30° C.

Step b) of the presently-disclosed process involves subjecting the combination obtained in step a), i.e., the polyacrylonitrile-based polymer and the solvent for the polymer, to the shearing action of at least one rotor-stator to produce a substantially uniform dispersion.

According to the process, step b) is conducted at ambient temperature. In an embodiment, step b) is conducted at a temperature of from 20° C. to 40° C., typically 25° C. to 30° C. In another embodiment, step a) and/or step b) are/is conducted at a temperature of from 20° C. to 40° C., typically 25° C. to 30° C.

The shearing action to which the combination of polyacrylonitrile-based polymer and solvent for the polymer is subjected is provided by at least one rotor-stator. As used herein, a rotor-stator is an assembly having a stationary part, called a stator, and a rotating part, called a rotor, disposed within it. The stator creates a close-clearance gap between the rotor and itself and forms a high-shear zone for materials in this gap. A material undergoes shear when one area of the material travels with a different velocity relative to material in an adjacent area. The rotor and/or stator may each comprise one or more rows, or rings, of teeth that provide openings between the teeth which affect the turbulent energy and shear that appear in the gaps between the rotor and stator. The rotor may also have features that facilitate the smooth flow of the combination of polyacrylonitrile-based polymer and solvent for the polymer, such as, for example, pumping legs. The number of rows of teeth and the number of teeth in each row on the rotor and/or stator are not particularly limited as long as the appropriate shearing action is achieved while not impeding the flow of the polymer and solvent. For instance, while more rows of teeth may provide a higher shear rate, issues with plugging, overheating, inconsistent flow and even backup of the polymer and solvent may arise.

The rotor-stator typically operates at high rotational speeds that produce high rotor tip speeds. The differential speed between the rotor and the stator imparts extremely high shear and turbulent energy in the gap between the rotor and stator. The amount of shear in the gap between rotor and stator may be characterized by the shear rate (t), which is given by the equation $t=V/g$ (in units of $s^{-1}$), where V is the tip speed of the rotor (in m/s), and g is the gap distance (in m) between the rotor teeth and the stator teeth. The tip speed (V), which is the linear speed of a point on the outer circumference of the rotor, is represented by the equation $V=\pi Dn$, where D is the diameter of the rotor (in meters), and n is the rotational speed of the rotor (in rev/s). A person of ordinary skill in the art would understand how to adjust the aforementioned parameters in order to obtain shear rates suitable for producing the shearing action used in the process.

In the process of the present disclosure, the shearing action of the at least one rotor-stator provides a shear rate of from about 30,000 $s^{-1}$ to about 46,000 $s^{-1}$, typically from about 33,000 $s^{-1}$ to about 38,000 $s^{-1}$.

The duration of time for which step b) is conducted may be less than or equal to 10 seconds, typically less than or equal to 5 seconds, more typically less than or equal to 3 seconds.

The substantially uniform dispersion of polyacrylonitrile-based polymer is then heated in the next step, step c), at a temperature and for a time sufficient to completely dissolve the polyacrylonitrile-based polymer (also referred to as the heating time), thereby forming a homogeneous solution. In the process described herein, the heating in step c) may be conducted using any method known those of ordinary skill in the art. Advantageously, the heating is done uniformly without the creation of hot and/or dead spots. Hot spots lead to burning of the polymer and/or solvent while dead spots result in non-dissolution of polymer. The heating in step c) may be conducted, for example, in a shell and tube heat exchanger. In an embodiment, the heating in step c) is conducted in a plug flow static mixer heat exchanger.

In an embodiment, the temperature in step c) at which the dispersion obtained in step b) is heated is from about 60° C. to about 100° C., typically from about 65° C. to about 85° C., more typically from about 70° C. to about 80° C. Unless otherwise indicated, the temperature at which the dispersion obtained in step b) is heated refers to the temperature as measured in the dispersion.

In an embodiment, the heating time in step c) is from about 1 minute to about 5 minutes, typically about 3 minutes. In the case in which the heating in step c) is conducted in a plug flow static mixer heat exchanger, those having ordinary skill in the art would understand that the heating time is the ratio of the hold-up of the dispersion in the heat exchanger and the flow rate of the dispersion through the heat exchanger.

The process of the present disclosure may be conducted batch-wise or continuously. However, in an embodiment, the process is conducted continuously.

The homogeneous solution produced by the process described herein is typically free of gels and/or agglomerated polymer. The presence of gels and/or agglomerated polymer may be determined using any method known to those of ordinary skill in the art. For example, a Hegman gauge may be used to determine the presence of gels and/or agglomerated polymer. The homogeneous solutions produced by the process described herein are generally stable and do not exhibit gel formation over time.

The homogeneous solution produced may be used as a spin dope for manufacturing carbon fiber precursor fiber, which can be converted to carbon fiber. The homogeneous solution may have a polymer concentration of at least 10 wt %, typically from about 16 wt % to about 28 wt % by weight, more typically from about 19 wt % to about 24 wt %, based on total weight of the solution.

The process described herein is suitable for producing homogeneous solutions of polyacrylonitrile-based polymer wherein the said solutions have viscosities of at least 600 poise, typically in the range of 600 to 2000 poise.

In the second aspect, the present disclosure relates to a system for producing the homogeneous solution described herein, the system comprising:
  i) a dispersing apparatus comprising:
    a powder inlet,
    an auger,
    a solvent inlet,
    an injection mantel comprising one or more solvent injection holes,
    at least one rotor-stator, and
    a product outlet; and
  ii) a plug flow static mixer heat exchanger.

In an embodiment, the dispersing apparatus is used to perform step a) or step b) of the process described herein. In another embodiment, the dispersing apparatus is used to perform both step a) and step b) of the process described herein.

The system and the manner in which it may be used to perform one or more steps of the process described herein will be described in further detail. However, the following description, as with the foregoing description, is meant to be illustrative and it is not intended that such details be regarded as limitations upon the scope of the disclosed subject matter except insofar as and to the extent that they are included in the accompanying claims.

In general, as shown in FIG. 1, the polyacrylonitrile-based polymer, in the form of a powder, is fed to the powder inlet (101) of the dispersing apparatus (100). An auger (102), typically a screw auger, which immediately follows the powder inlet, mechanically feeds the polymer powder into a chamber that is formed by the substantially cylindrical injection mantel (103), which comprises one or more solvent injection holes through which solvent for the polymer, which is free of non-solvent, is sprayed. The one or more solvent injection holes are located in the injection mantel and, thus, along the sides of the chamber formed by it and are fed by the solvent inlet (104). The polymer powder combines with the solvent that is injected through the one or more solvent injection holes provided by the injection mantel. Typically, one or more fine streams of the solvent are sprayed onto the stream of the polyacrylonitrile-based polymer powder.

In an embodiment, the powder inlet is vertically-oriented and the solvent inlet, which is downstream of the powder inlet, feeds the one or more solvent injection holes, which are oriented substantially perpendicularly to the powder inlet.

The diameter of the one or more solvent injection holes is not particularly limited. However, to reduce the likelihood of clogging by the polymer powder, the diameter of the one or more solvent injection holes is from 1 to 5 mm, typically from 1 to 2 mm.

Further to the combination of the polymer powder and the solvent for the polymer, distribution of the polymer powder among the solvent may also be achieved by the system.

The dispersing apparatus described herein includes at least one rotor-stator (105) oriented downstream of the injection mantel. The combined polymer powder/solvent is provided to the at least one rotor-stator. The rotor-stator operates at high rotational speeds that produce high rotor tip speeds. The differential speed between the rotor and the stator imparts extremely high shear and turbulent energy in the gap between the rotor and stator. The shearing action of the at least one rotor-stator provides a shear rate of from about 30,000 $s^{-1}$ to about 46,000 $s^{-1}$, typically from about 33,000 $s^{-1}$ to about 38,000 $s^{-1}$. The combined polymer powder/solvent is subjected to the shearing action of the said at least one rotor-stator to produce a substantially uniform dispersion in which the polymer powder particles are evenly dispersed throughout the solvent for the polymer, but remains undissolved. The polymer dispersion is then recovered from the product outlet (106).

The polymer dispersion that is collected from the product outlet of the dispersing apparatus is then conveyed to the plug flow static mixer heat exchanger, which is used to heat the dispersion to dissolve the polyacrylonitrile-based polymer in the solvent, thereby forming a homogeneous solution. The polymer dispersion that is collected from the product outlet may be conveyed to the plug flow static mixer heat exchanger using any apparatuses and/or methods known to those of ordinary skill in the art. For example, the polymer dispersion may be pumped from the product outlet of the dispersion apparatus into a surge tank and then pumped into the plug flow static mixer heat exchanger.

Thus, in an embodiment, the system of the present disclosure further comprises:

iii) a surge tank,
iv) a first and second pump, and
v) a collection tote;

wherein
the surge tank is connected between the dispersing apparatus and plug flow heat exchanger,
the first pump is connected between the dispersing apparatus and the surge tank, and
the second pump is connected between the surge tank and the plug flow static mixer heat exchanger.

The processes and systems described herein will be illustrated in the following non-limiting examples.

EXAMPLES

Example 1. Formation of Homogeneous PAN (2% MAA) Polymer Dope

In a number of trials, PAN polymer having 2% methacrylic acid comonomer (MW 188,000 g/mol), in the form of a powder, was combined directly with DMSO, which was free of water, at ambient temperature, and the combination was sheared at ambient temperature to produce a substantially uniform dispersion. DMSO was filtered with a 0.5-micron filter prior to use. The apparatus used to produce the substantially uniform dispersion was an IKA MHD-2000/5 dispersing apparatus fitted with an injection mantel comprising a plurality of 1-mm solvent injection holes and a rotor-stator in which the rotor had one row of 4 teeth with pumping legs and a stator with one row of 15 teeth. The substantially uniform dispersion produced was pumped from the IKA MHD-2000/5 dispersing apparatus to a surge tank and then conveyed to a plug flow static mixer heat exchanger (HX) connected to it. The dispersion obtained was then heated in the heat exchanger to completely dissolve the polymer, thereby forming the homogeneous solution. The trial conditions are summarized in Table 1 below.

TABLE 1

| Ex. | Average concentration (wt %) | Viscosity @ 45° C. (Poise) | Rotor speed (RPM) | Temperature of polymer dope leaving HX (° C.) | Polymer dope Flow rate (lb/hr) | Heating Time (min) |
|---|---|---|---|---|---|---|
| A | 17.87 | 651 | 4543 | 80 | 160 | 3.33 |
| B | 18.09 | 666 | 3867 | 80 | 160 | 3.33 |
| C | 18.57 | 843 | 4833 | 80 | 160 | 3.33 |
| D | 20.69 | 1625 | 4543 | 80 | 160 | 3.33 |
| E | 21.12 | 1890 | 4543 | 80 | 160 | 3.33 |

The shear data is summarized in Table 2 below.

TABLE 2

| Ex. | Rotor speed (RPM) | Diameter of Rotor (inches) | Tip Speed (m/s) | Teeth Gap (mm) | Shear Rate ($s^{-1}$) | Number of Rotor Teeth | Number of Stator Teeth |
|---|---|---|---|---|---|---|---|
| A | 4543 | 3 | 18.12 | 0.5 | 36,236 | 4 | 15 |
| B | 3867 | 3 | 15.42 | 0.5 | 30,839 | 4 | 15 |
| C | 4833 | 3 | 19.27 | 0.5 | 38,549 | 4 | 15 |
| D | 4543 | 3 | 18.12 | 0.5 | 36,236 | 4 | 15 |
| E | 4543 | 3 | 18.12 | 0.5 | 36,236 | 4 | 15 |

No change, based on the rheology of the polymer dopes as determined by HAN slope analysis, was observed in the polymer dopes after 4 days of aging, indicating that the dopes formed by the process are stable with no gels forming over time.

Example 2. Spinning of Homogeneous PAN (2% MAA) Polymer Dope

The homogeneous PAN polymer dope produced in Example 1 was wet-spun or air-gap spun in a number of trials and filter pressure rise was recorded for each trial. Prior to spinning, homogeneous PAN polymer dope produced in Example 1 was stored in a tote maintained at various temperatures and under vacuum. The dope was prefiltered using various filters. Average pressure rise per 100 liter of polymer dope was calculated from the difference in pressure between the inlet and outlet of the filters. The results are summarized in Table 3 below. The flux rate through the filters varied from 20 to 30 L/m² hr. The flux rate is the polymer flow rate per unit surface area of the filter. Run time for the below spinning trials varied between 12 to 36 hours. Total dope pumped through the filters varied between 500 lbs to 700 lbs.

TABLE 3

| Ex. | Tote Jacket Temp (° C.) | Average Delta P Prefilter/100 L of dope | Average Delta P Spinneret/100 L of dope | Average Delta P Airgap die/100 L of dope | Prefilter configration |
|---|---|---|---|---|---|
| A | 50 | 0.55 | −2.35 | −2.05 | 10 micron/5 micron-unpleated |
| B | 60 | −0.55 | −3.5 | −2.5 | 10 micron/5 micron-unpleated |
| C | 70 | 0 | −3 | −3 | 5 micron/3 micron-Pleated |
| D* | 65 | −0.2 | 1 | 2 | 5 micron/3 micron-Pleated |
| E* | 65 | −1 | −2 | 0 | 5 micron/3 micron-Pleated |

*air-gap spun

As shown in Table 3, there was negligible or no pressure rise, indicating complete dissolution and no undissolved particles.

Example 3. Formation of Homogeneous PAN (8% MAA) Polymer Dope

In a number of trials, PAN polymer having 8% methacrylic acid comonomer (MW 140,000 g/mol; intrinsic viscosity 1.5), in the form of a powder, was combined directly with DMSO, which was free of water, at ambient temperature, and the combination was sheared at ambient temperature to produce a substantially uniform dispersion. DMSO was filtered with a 0.25-micron filter prior to use. The concentration of the polymer below water was between 22.8 to 24.7%. The apparatus used was the same as the one used in Example 1. The shear data and heating conditions are summarized in Tables 4 and 5, respectively, below.

TABLE 4

| Ex. | Rotor speed (RPM) | Diameter of Rotor (inches) | Tip Speed (m/s) | Teeth Gap (mm) | Shear rate (s⁻¹) |
|---|---|---|---|---|---|
| F | 5316.7 | 3 | 21.20 | 0.5 | 42403.6 |
| G | 5316.7 | 3 | 21.20 | 0.5 | 42403.6 |
| H | 5316.7 | 3 | 21.20 | 0.5 | 42403.6 |
| I | 5316.7 | 3 | 21.20 | 0.5 | 42403.6 |
| J | 4350.0 | 3 | 17.35 | 0.5 | 34693.9 |
| K | 4350.0 | 3 | 17.35 | 0.5 | 34693.9 |
| L | 4350.0 | 3 | 17.35 | 0.5 | 34693.9 |
| M | 4350.0 | 3 | 17.35 | 0.5 | 34693.9 |

TABLE 5

| Ex. | Temperature of polymer leaving HX (° C.) | Flow rate (lb/hr) | HX polymer hold up (lbs) | Heating Time (minutes) |
|---|---|---|---|---|
| F | 80 | 85 | 6.3 | 4.45 |
| G | 80 | 160 | 6.3 | 2.36 |
| H | 70 | 85 | 6.3 | 4.45 |
| I | 70 | 160 | 6.3 | 2.36 |
| J | 80 | 85 | 6.3 | 4.45 |
| K | 80 | 160 | 6.3 | 2.36 |
| L | 70 | 85 | 6.3 | 4.45 |
| M | 70 | 160 | 6.3 | 2.36 |

The rheology of the polymer dope made according to the present example was evaluated by determining the HAN slope of each polymer dope made. The HAN slope is determined by plotting storage modulus vs cross-over modulus. The HAN slope of a PAN-based polymer solution made by solution polymerization, thus being homogeneous, typically has a HAN slope of 1.7. All of the samples (Examples F-M) made according to the inventive dissolution process had HAN slope in the range of 1.68 to 1.7. It can be concluded that all of the solutions made were as homogeneous as polymer made by solution polymerization and confirms that no gels were formed under the described conditions.

The samples were then tested using Pressure Tester. Pressure tester is a unit with very high flux rate through the filter (1800 L/m²hr) due to small surface area of the filter used in the test. Due to high flux rate, the filter tends to plug fast and various different solution can be tested faster with small amount of sample required. 2 hours of this test is equivalent to 7 days of a run on a continuous spinning line. The results from the Pressure Tester provide an indication of undissolved particles and give an estimation of the filter life. A lower pressure drop is indicative of longer filter life. All the samples were tested using a 10-micron filter. For this testing, the filter block temperature was set at 45° C. and a flow rate of 15 cc/min was used.

Figure 2:
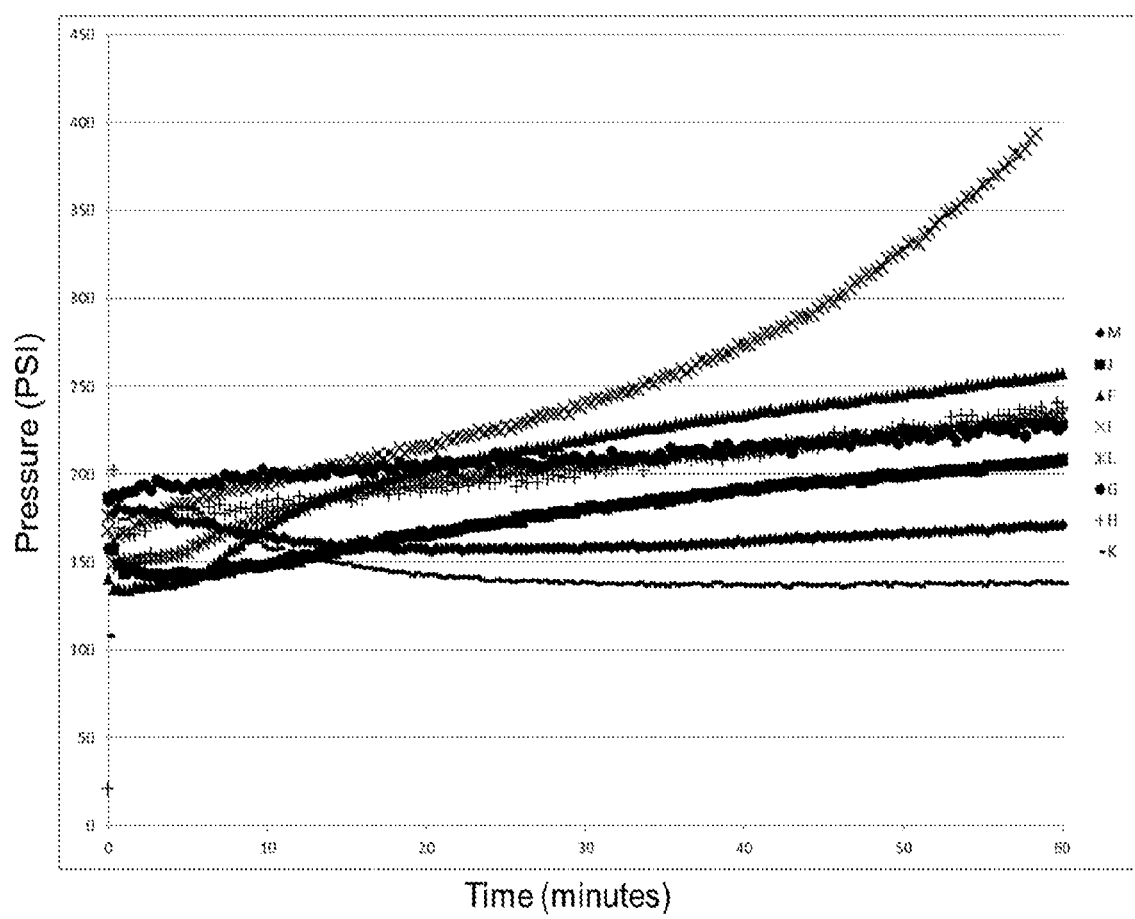
FIG. 2 shows a plot of pressure rise as a function of time in a pressure test of homogeneous polyacrylonitrile-based polymer solutions made according to the inventive process described herein.

The pressure rises were recorded and plotted as a function of time, from which slopes were obtained. The plot is shown in FIG. 2 and a summary of the slopes for the various trials is found in Table 6 below.

TABLE 6

| Ex. | Slope |
|---|---|
| F | 1.2083 |
| G | 0.7007 |
| H | 1.1801 |
| I | 5.0966 |
| J | 0.9367 |

TABLE 6-continued

| Ex. | Slope |
|---|---|
| K | −0.0074 |
| L | 0.9884 |
| M | 0.3983 |

A smaller slope is indicative of longer filter life and lower undissolved particles. As shown in Table 6, Ex. K, in which the rotor speed was low (4350 RPM), heating temperature was high (80° C.), and heating time was low (2.36 min), gave the best result. This result indicates that lower rotor speed, higher temperature of dissolution and lower residence time in heat exchanger would provide optimal filter life, particularly in a continuous process.

What is claimed is:

1. A process for producing a homogeneous solution comprising dissolved polyacrylonitrile-based polymer, the process comprising:
   a) spraying one or more streams of solvent onto a stream of polyacrylonitrile-based polymer, in the form of a powder, at ambient temperature, in a dispersing apparatus comprising at least one rotor-stator, and
   subjecting the combination of polyacrylonitrile-based polymer and solvent to the shearing action of the at least one rotor-stator, at ambient temperature, to produce a substantially uniform dispersion,
   b) removing the dispersion from the dispersing apparatus, and
   c) heating the dispersion obtained from the dispersing apparatus at a temperature and for a time sufficient to completely dissolve the polyacrylonitrile-based polymer, thereby forming the homogeneous solution.

2. The process according to claim 1, wherein step a) is conducted at a temperature of from 20° C. to 40° C.

3. The process according to claim 1, wherein the polyacrylonitrile-based polymer comprises repeating units derived from acrylonitrile and at least one comonomer selected from the group consisting of vinyl-based acids, vinyl-based esters, vinyl amides, vinyl halides, ammonium salts of vinyl compounds, sodium salts of sulfonic acids, and mixtures thereof.

4. The process according to claim 1, wherein the polyacrylonitrile-based polymer comprises repeating units derived from acrylonitrile and at least one comonomer selected from the group consisting of methacrylic acid (MAA), acrylic acid (AA), itaconic acid (ITA), methacrylate (MA), ethyl acrylate (EA), butyl acrylate (BA), methyl methacrylate (MMA), ethyl methacrylate (EMA), propyl methacrylate, butyl methacrylate, β-hydroxyethyl methacrylate, dimethylaminoethyl methacrylate, 2-ethylhexylacrylate, isopropyl acetate, vinyl acetate (VA), vinyl propionate, vinyl imidazole (VIM), acrylamide (AAm), diacetone acrylamide (DAAm), allyl chloride, vinyl bromide, vinyl chloride, vinylidene chloride, sodium vinyl sulfonate, sodium p-styrene sulfonate (SSS), sodium methallyl sulfonate (SMS), sodium-2-acrylamido-2-methyl propane sulfonate (SAMPS), and mixtures thereof.

5. The process according to claim 1, wherein the solvent is selected from the group consisting of dimethyl sulfoxide (DMSO), dimethyl formamide (DMF), dimethyl acetamide (DMAc), and ethylene carbonate (EC).

6. The process according to claim 1, wherein the solvent is dimethyl sulfoxide (DMSO).

7. The process according to claim 1, wherein the solvent is free of water.

8. The process according to claim 1, wherein the shearing action of the at least one rotor-stator provides a shear rate of from about 30,000 $s^{-1}$ to about 46,000 $s^{-1}$.

9. The process according to claim 1, wherein step (a) is conducted for less than or equal to 10 seconds.

10. The process according to claim 1, wherein the heating temperature in step c) is from about 60° C. to about 100° C.

11. The process according to claim 1, wherein the heating in step c) is conducted uniformly without creation of hot/dead spots.

12. The process according to claim 1, wherein the heating in step c) is conducted in a plug flow static mixer heat exchanger.

13. The process according to claim 1, wherein the heating time in step c) is from about 1 minute to about 5 minutes.

14. The process according to claim 1, wherein the process is conducted continuously.

15. The process according to claim 1, wherein the homogeneous solution produced is free of gels and/or agglomerated polymer.

16. The process according to claim 1, wherein the dispersing apparatus in step a) further comprises:
   a powder inlet, through which polyacrylonitrile-based polymer is introduced,
   an auger,
   an injection mantel comprising one or more solvent injection holes, through which the solvent is sprayed, and
   a product outlet.

17. The process according to claim 16, wherein the diameter of the one or more solvent injection holes is from 1 to 5 mm.

18. A system for producing a homogeneous solution according to the process of claim 1, the system comprising:
   i) a dispersing apparatus comprising:
   a powder inlet,
   an auger,
   a solvent inlet,
   an injection mantel comprising one or more solvent injection holes,
   at least one rotor-stator, and
   a product outlet; and
   ii) a plug flow static mixer heat exchanger.

* * * * *